United States Patent [19]

Perdue

[11] 4,134,204
[45] Jan. 16, 1979

[54] ROTARY FLAIL CUTTER SYSTEM

[76] Inventor: Bennie G. Perdue, 302 S. Houston School Rd., Lancaster, Tex. 78040

[21] Appl. No.: 691,764

[22] Filed: Jun. 1, 1976

[51] Int. Cl.² ..................... A01D 35/26; A01G 3/06
[52] U.S. Cl. ..................................... 30/276; 56/12.7
[58] Field of Search ...................... 221/71; 222/169; 226/134, 168; 30/276, 347; 56/12.7

[56] References Cited

U.S. PATENT DOCUMENTS

| | | | |
|---|---|---|---|
| 2,709,323 | 5/1955 | Swan | 51/335 |
| 2,771,721 | 11/1956 | Reiman | 51/335 |
| 3,826,068 | 7/1974 | Ballas et al. | 56/12.7 |
| 3,928,911 | 12/1975 | Pittinger | 56/12.7 X |
| 4,047,299 | 9/1977 | Bair | 30/347 |

Primary Examiner—Jimmy C. Peters
Attorney, Agent, or Firm—Clarence A. O'Brien; Harvey B. Jacobson

[57] ABSTRACT

A spool upon which one or more lengths of filament are wound is provided and housed within a cylindrical cover having one or more generally radial openings formed through one wall portion thereof and the free ends of the filaments are threaded through the openings and extend outwardly therefrom for flail-type cutting of vegetation thereby when the spool and housing are rotated as a single unit at high speed. The spool is controllably rotatable relative to the housing whereby the spool may be rotated in discrete controllable increments in a direction to unwind the filaments therefrom so as to renew the extended end portions of the filaments projecting outwardly of the housing by said predetermined increments as the extended ends of the filaments incur breakage. Latching structure is operatively associated with the spool and housing for releasably retaining the spool in adjusted angularly displaced position relative to the housing and the latching structure is remotely operable from a mounting structure relative to which the spool and housing may be rotated at high speed and during high speed rotation of the spool and housing relative to the mounting structure. In this manner, when breakage of the extended end portion of a filament occurs, a filament may be further extended during operation of the cutter so as to renew the extended end portion of the filament to the desired length.

3 Claims, 7 Drawing Figures

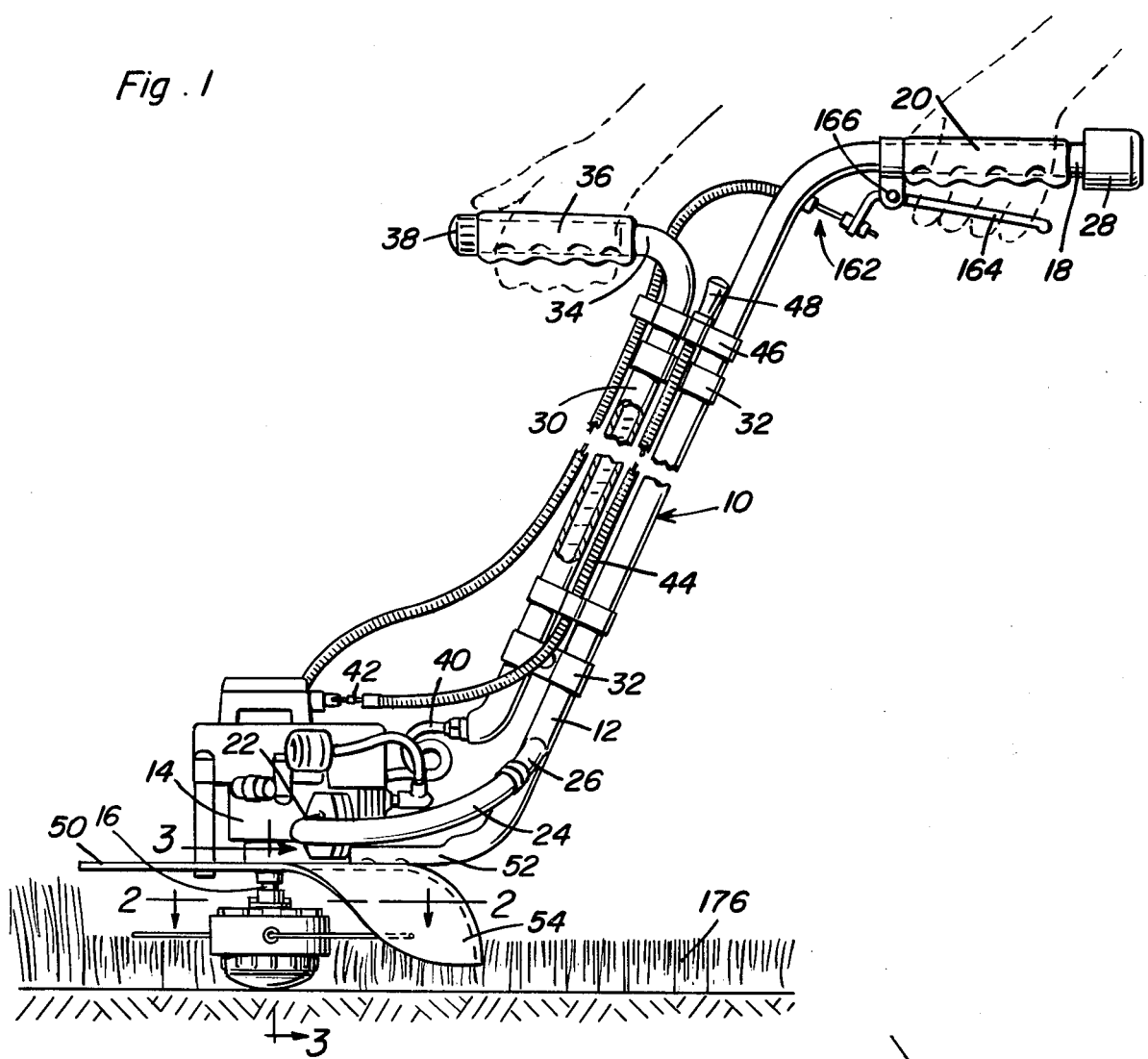
Fig. 1
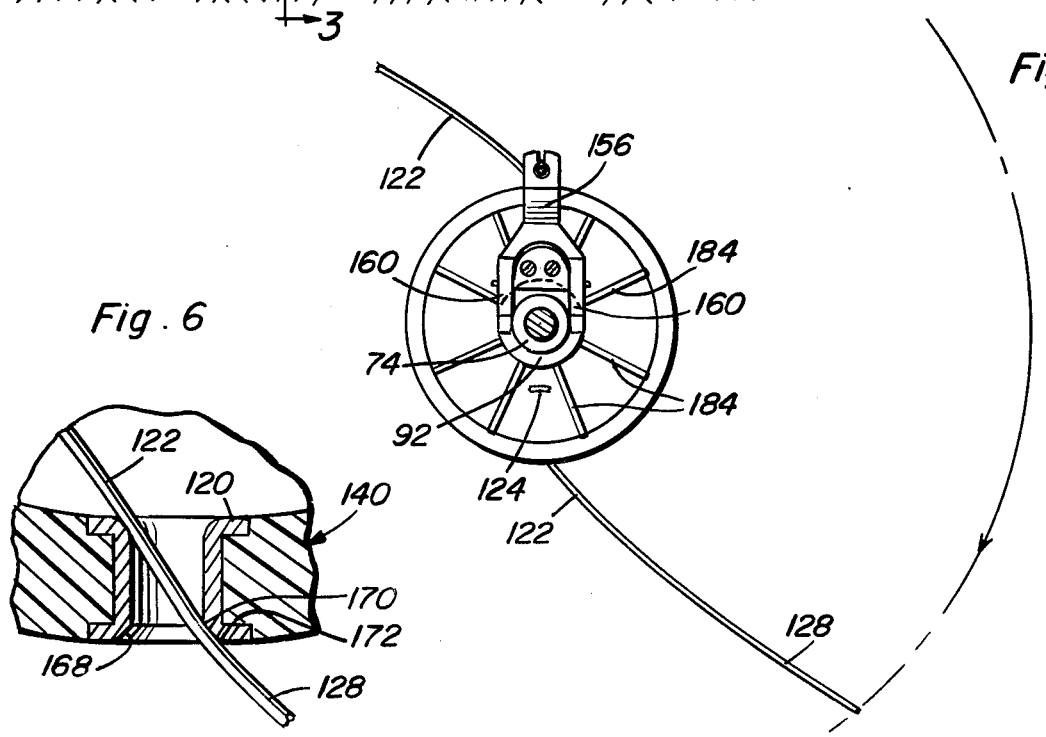
Fig. 2
Fig. 6

ROTARY FLAIL CUTTER SYSTEM

BACKGROUND OF THE INVENTION

There are various forms of flail-type cutters being marketed for the purpose of performing cutting and similar functions such as light cultivation and edging by means of non-rigid filaments which extend generally radially outwardly from a cutter head rotated at high speeds. Desirable results are obtained by these filaments rotating at high speed under which they assume a tensioned condition due to centrifugal force. It has been found that these filaments can be used to cut grass and other delicate vegetation more safely and with a greater degree of flexibility than devices using rotating rigid blades.

The industry producing cutters of this type has generally avoided the use of either metallic or composite filaments inasmuch as it has seemed that filaments of this type exhibit inferior operating life characteristics when used with commonly available engines and electric motors. In particular, the metallic or composite filaments have been found to break more rapidly than plastic filaments.

However, I have found that the operating life characteristic of filements, whether plastic, metallic or composite, is more directly a function of the system employed to rotate and restrain the free end of the filement than a function of the filament material. Furthermore, prior devices have not addressed the fundamental problem of flail cutting which will be herein described. The disclosure of the nature and effect of several basic phenomena which occur and whose effects are interrelated, the statement of the basic problem, and the disclosure of a system which deals with that problem so as to accommodate and control the basic phenomena, will yield significant advances in the state of the art.

Hereinafter will be described the basic phenomena, the basic problem and a radically new, different and more productive search to the solution of the basic problem to yield substantial advancement of the art and enable the production of a new generation of filament cutters with characteristics far superior to those now available.

In flail cutting a flexible filement is rotated at some angular velocity. The centrifugal force of rotation imposes an axial load on the filament. Each segment of the filament has a kinetic energy which is $$KE = \tfrac{1}{2} mv^2$$

where
  m = mass of the segment
  v = velocity of the segment

The velocity of each segment is a function of its distance from the center of rotation or $$v = rw$$

where
  r = distance from center of rotation
  w = speed of rotation

Therefore the kinetic energy of a segment is
$$KE = \tfrac{1}{2} m (rw)^2$$

This kinetic energy is available for instantaneous release when the filament encounters an obstacle such as a blade of grass. It is this eneregy release which effects cutting and other action which can be achieved in flail cutting.

Thus energy is stored in the filament and alternately released through impact and replenished by the power source, typically an electric motor or gasoline engine.

Cutting action improves as the ratio of stored kinetic energy to filament diameter is increased. This can be seen intuitively since for a given filament diameter a greater energy release will provide more effective cutting action.

Thus it would seem that higher rotational speed would be desirable. However, rotational speed also imposes a centrifugal load on the filament which is $$C = mw^2 r$$

where
  m = mass w = speed of rotation
  r = distance from center of rotation

Thus each filament segment exerts a force on every other segment nearer the center of rotation or point of restraint. Above a threshold speed, the summation of the forces acting on the extended filament yields a total force at the point of restraint such that at that point the tensile strength of the filament is exceeded producing failure.

In flail cutting the filament does not assume a straight radial position relative to the axis of rotation of the cutter head (even when not encountering obstructions) inasmuch as wind force acting upon the extended end portion of the filament imparts a drag thereon. Thus, the extended end portion of the filament continuously curves rearward relative to the direction of rotation. As the filament encounters obstructions, phenomena occur which coact to shorten the operating life of the filament. These phenomena will be called impact shear, impact abrasion, impact heating and tensile fatigue.

When a segment of the filament, traveling at high velocity, encounters an obstacle, the inertia of the free end of the filament and the inertia of the obstacle encountered acting in opposition to the inertia of the filament segment causes the filament to partially "wrap around" the obstacle. During this "wrap around" period the local filament segment experiences shear forces whose magnitude are a function of the contour of the obstruction, the mass of the obstruction, the velocity of the filament and the cross sectional mass and geometry of the filament. If the obstacle encountered has sufficient mass the filament will fail at the point of contact with the obstacle or at some adjacent point if there is a weakness in the filament. Impact shear occurs with every impact so that the filament encounters shear loading at very high frequency. Even where the individual impact does not produce instaneous failure, it induces localized damage making the filament more susceptible to future failure at that point. Thus, impact shear has an accumulative effect which is an important factor in the operating life expectancy of a given segment of the filament. Also, because the kinetic energy of a given segment increases with the square of its distance from the center of rotation, the outermost segments of the filament are most susceptible to failure in a shear mode.

Filament abrasion occurs when an obstruction has sufficient mass and geometry to actually cut away a portion of the filament. Thus, the filament may be "niched" or split at a given point but may not, at that instant, totally sever. This form of damage typically occurs when the filament encounters very dense obstacles such as rocks or curbing, asphalt and similar physical features and also has an accumulative effect in shortening the operating life of a filament segment. In the case of plastic filaments, this phenomenon frequently results in the "split end" condition where the tip of the filament splits into several small fibers. Of course, a plurality of smaller fibers, due to their greater flexibility and reduced inertia do not operate as efficiently in cutting vegetation. Many metallic and composite filaments exhibit shear and abrasion resistance superior to that obtainable from plastic filaments. Accordingly, metallic and composite fibers are less susceptible to failure due to abrasion and shear.

Impact heating is generated by the rubbing action which occurs when a filament section impacts with an obstruction and by hysteresis as the filament undergoes deformation as a result of impact. In general, insufficient heat is generated to melt a plastic filament segment at the point of impact, although heating as a result of impact becomes a more serious problem as larger diameter filaments are used.

It is obvious that an individual filament encounters a very high number of impacts per second. This induces very high frequency vibrations in the filament. Plastic filaments do not transmit vibrations as well as metallic filaments and a smaller percentage of the overall tensile load is transmitted to the point of restraint. The most severe tensile load on the filament occurs at the point where it is constrained. With conventional cutting heads this is either at the opening in the housing or hub or inside the housing or hub on the spool upon which the filament is wound, or a combination of the two.

Plastic, metallic and composite filaments are all subject to tensile failure at the point of constraint. Since the fatigue of the filament is a combined function of its angular velocity, its extended length and mass, the loading it encounters from impact with obstructions, and the structure by which it is restrained, if fatigue of the filament is suitably controlled, filaments utilized for cutting purposes can be employed with superior results.

Acceptance of the prior assertion requires a statement of the fundamental problem of flail cutting in the context of the present state of the art.

The present state of the art is such that filament breakage is believed to be the fundamental problem. This is evidenced by the attention devoted to minimizing filament breakage. It has been recognized that breakage often occurs at the point of primary filament restraint which is typically at the exit opening in the cover which houses one or more filament reservoirs. Various devices have been employed, such as the "curvilinear bearing surfaces" generally described in U.S. Pat. Nos. 3,708,967, 3,826,068 and 3,859,776, to reduce the incidence of such breakage.

However, it is asserted that filament breakage per se is not the fundamental problem and that optimum system performance will result when the total breakage rate is sacrificed to obtain preferential breakage which will be hereinafter explained.

The fundamental problem, with the present state of the art, is that filament breakage causes inconvenience and greatly reduces the productivity of the cutting system. This stems from the necessity of stopping the rotating filament reservoir in order to activate the various mechanisms which have been devices to enable additional filament to be extended. There is an inherent attendant drawback in that the user becomes accustomed to frequent physical contact with portions of the cutting system which are capable of imparting injury.

The user approaches physical contact with a rigid steel lawnmower or edger blade with caution on the relatively infrequent occasions when it is necessary. However, presently available flail cutting systems require such contact with a frequency which tends to invite carelessness.

In addition, the inconvenience inherent in present filament storage and feed systems inhibits the user in applying the systems to heavy growth and almost totally precludes their use in other applications, such as lawnmowers, where it would be impractical to advance additional filament using present feed systems.

Thus, it is asserted that the basic problem is not one of filament breakage. The basic problem is to provide a system which controls filament breakage while providing a safe and effective means for dispensing additional filament from the reservoir to replenish segments which are lost.

The desirability of an improved dispensing system, particularly one which can be activated and controlled while the device is in continuous operation, should be obvious. The desirable elements of controlled breakage are as follows.

The filament is an expendable element of the system. However, there are clearly preferred breakage modes. Since the tip segment effects the greatest cutting action, it is abraided and worn away most rapidly. Therefore, the most preferred breakage area is near the end of the extended fiber. Conversely, the least preferred areas are those segments near the point of restraint, or worse, beyond the point of restraint into the storage area. This should be obvious since, if the filament breaks farther from the tip of the cutting end, a greater portion is lost with no commensurate benefit. Loss of short segments at the tip is much preferred.

There are three approaches which can be used to reduce breakage at the root of the filament. These approaches are reduced operating speed (which reduces the fundamental vibratory frequency and the tensile load), distribution of restraint forces over greater filament lengths (to reduce load concentration), or special restraint of the filament in such a manner as to control the fundamental "breaking" process.

The reduction of speed tends to reduce the cutting effectiveness because such effectiveness is a direct function of the kinetic energy stored in a segment of the filament. Therefore, lowering the rotational speed is not a desirable approach to reducing filament breakage, because overall performance of the system suffers.

Much has been attributed to the importance of "curvilinear" bearing surfaces parallel to the axis of rotation at the point of restraint of the filament. These "curvilinear" bearing surfaces have been provided as a means for distributing loading over a greater filament length so as to thereby extend operating life of the filament. Curvilinear surfaces are disclosed in U.S. Pat. Nos. 3,708,967, 3,826,068 and 3,859,776. However, the precise contour and function of these "curvilinear" bearing surfaces have not been defined nor has the effect of their particular contour been precisely explained. The utilization of "curvilinear" bearing surfaces has apparently been adopted as a result of observation that a sharp corner at the bearing surface results in rapid filament breakage at the point of restraint. This would be expected due to excess shear and vibratory load concentrations on the filament at that point.

While the use of a "curvilinear" bearing surface eliminates the rapid filament breakage which occurs when a sharp angle at the bearing surface is utilized, it still does not actively contribute to selective breakage outwardly of the bearing surface. When breakage of the filament occurs at the bearing surface the filament end will often be retracted within the housing surrounding the spool and it is therefore extremely difficult to extend the desired length of filament from the spool and requires access to the interior of the housing in order to thread the end of the filament to be extended through the opening in the housing for the spool defining the bearing surface.

However, if a bearing surface which causes controlled angular deformation of the filament at the bearing surface is provided and structure enabling selective increment feed of the filament from the spool during operation of the associated cutter is provided, each time a new section of filament is engaged with the bearing surface that section is subject to tensile and vibratory loading and is therefore partially weakened. Repeated increment feeding of the filament during operation of the cutter thereby produces a free end portion of the filament which has longitudinally spaced weakened zones therealong. These longitudinally spaced weakened zones are, as well as intermediate portions of the filament, subject to impact with the material being cut and impact shear and abrasion and friction heating as a result thereof. These phenomena tend to further weaken the spaced pre-weakened zones more rapidly than the "virgin" filament therebetween and the outermost weakened zone is of course more severely weakened than the preweakened zones spaced inwardly thereof. This results in a substantial majority of the breakage of the filament as a result of its use in cutting vegetation occurring at the outer end portion of the free end thereof. Therefore, inasmuch as the filament should be considered as an expendable item, a cutter including means for increment feed of the filament during operation of the cutter and also means for pre-weakening the filament in the zones thereof successively with the bearing surface of the housing is operable in a substantially continuous manner through repeated increment feeding of the filament in order to renew the outer end portions thereof which are repeatedly broken therefrom. During operation of the cutter, as successive segments of filament are broken from the free end thereof and the filament is fed in increments from the spool, the localized weakened zones disposed outwardly of the bearing surface experience cumulative stress concentration and their tensile properties degenerate. Thus, a weakened zone toward the free end of the filament, having experienced more impact with the vegetation being cut than weakened zones closer to the bearing surface, is weaker and more likely to sever. This yields selective severing or breakage of the filament with a higher incidence of breakage near the tip of the filament. Therefore, increment feeding of the filament may be continued during operation of the cutter with a substantial reduction of unwanted breakage of the filament at the bearing surface or inwardly thereof necessitating operation of the cutter to be terminated in order to manually extend a new length of filament from the housing.

The preferred geometry of the bearing surface is a function of the filament geometry, material properties, the extended filament length and the average speed of rotation. However, it has been determined that for various available metallic, non-metallic and composite filaments, and for speeds of rotation between 1000 and 10,000 rpm a bearing surface with at least one angular break where the included angle is not greater than 178° nor less than 100° will produce localized filament compression and weakening to achieve the desired result of selective breakage. Where multiple angular surfaces are employed they may be separated by straight or curved surface segments without noticeable difference but the distance between pairs of relatively angulated surfaces should be substantially less than the length of the increment of filament extended by one advance of the feed mechanism so as to insure that the extended segment of the filament has discrete weakened zones.

BRIEF DESCRIPTION OF THE INVENTION

The cutter system of the instant invention utilizes a rotary cutter head including a coaxial spool from which a filament wound on the spool may be fed in increments therefrom and the spool is enclosed within a housing structure defining an opening therein through which the end of the filament extends with the surfaces of the housing defining the trailing surfaces of the opening including at least one angular surface for pre-weakening, to a slight degree, of that portion of the filament engaged with the bearing surface so that each time a new increment of filament is fed from the spool a new spaced weakened zone of the filament will be added to the end portion thereof projecting outwardly of the opening.

The mechanism by which the filament may be fed in increments from the spool is operable during operation of the cutter when the spool is rotating at high speeds.

The main object of this invention is to provide a rotary flail cutter system which will be operative over extended periods of time and which will seldom require shut-down of the cutter system in order to manually feed a new length of filament therefrom.

Another object of this invention is to provide a rotary flail cutter system of the type which may utilize plastic monofilament, a metallic filament or a composition filament with greater effectiveness than presently available systems.

Another very important object of this invention is to provide a rotary flail cutter system including a coaxial spool for containing one or more filaments wound thereon and having the end portions extended therefrom with the filaments received through openings in a housing disposed about the spool and rotatable with the latter and the edges of the openings engaged with the filaments including surface portions partially operative as bearing surfaces upon which substantial tension loading of the filaments is tranferred and about which the filaments are deflected to an extent sufficient to cause lateral compression of the filaments at that point and partial weakening of the filaments and with the filament spool including structure whereby increment sections of filaments may be selectively fed therefrom so as to enable successive zones of the filaments engaged with the bearing surface to be subsequently weakened and each partially or pre-weakened zone of the filaments disposed outwardly of the openings subject to further fatigue by impact with vegetation being cut by the filaments while swinging at high rotational speeds to thus insure controlled breakage of the filaments near the free ends thereof, as opposed to at or inwardly of the bearing surfaces of the housing.

Yet another object of this invention is to provide a rotary flail type cutter in accordance with the immediately preceding object and constructed in a manner whereby predetermined increments of filament may be fed from the spool of the cutter while the cutter is in operation.

A final object of this invention to be specifically enumerated herein is to provide a rotary flail cutter system in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary side elevational view of the cutter system of the instant invention with portions of the cutter being broken away and illustrated in vertical sections;

FIG. 2 is an enlarged horizontal sectional view taken substantially upon the plane indicated by the section line 2—2 of FIG. 1;

FIG. 6 is an enlarged horizontal sectional view of the portion of the spool enclosing housing having the feed opening formed therein and illustrating the manner in which the filament is deflected by the juncture of relatively angulated surfaces defining the feed opening.

Figure 3:
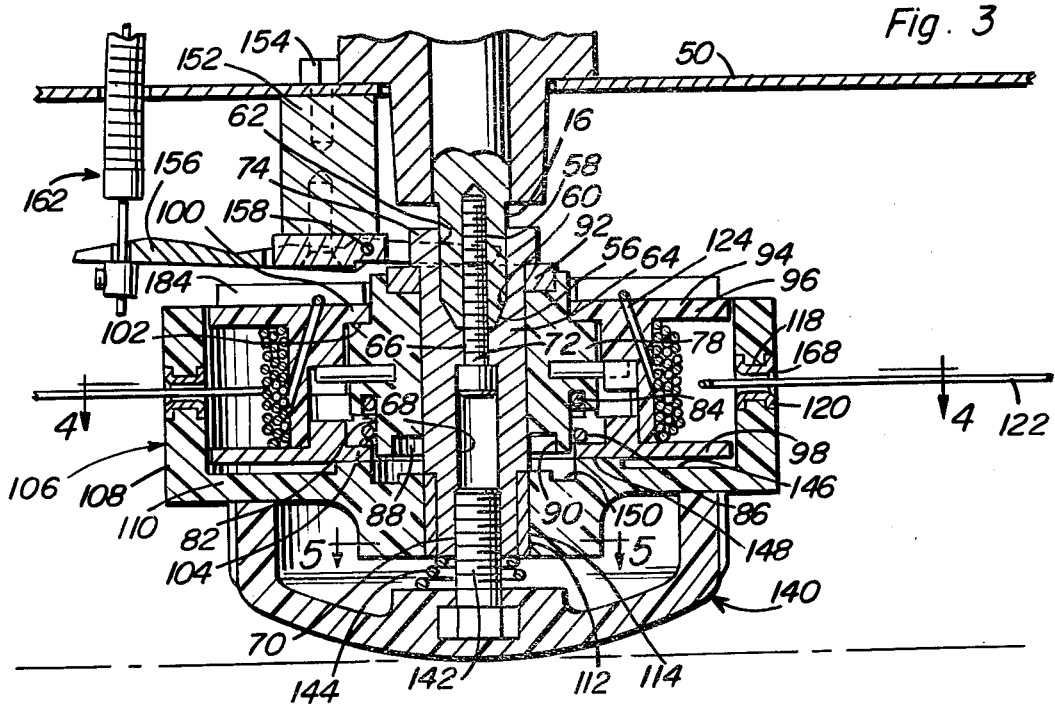
FIG. 3 is a fragmentary enlarged transverse vertical sectional view taken substantially upon the plane indicated by the section line 3—3 of FIG. 1.

Referring now more specifically to the drawings the numeral 10 generally designates the flail-type cutter of the instant invention. The cutter 10 includes an upwardly and outwardly inclined main handle 12 from whose lower end a lightweight gasoline engine 14 is supported. The engine 14 includes a downwardly directed rotary output shaft 16 and the upper end of the handle includes a horizontally directed portion 18 having a handgrip 20 disposed thereon.

The engine 14 includes an air intake 22 to which the discharge end of an inlet hose 24 is connected and the outlet end of the discharge hose 24 is connected to a branch tube 26 which opens into the interior of the lower end of the hollow tubular handle 12. The free end of the upper end portion 18 is open and has an air filter assembly 28 secured thereover. Accordingly, air is supplied to the air inlet 22 through the tubular handle 12, it being understood that the air inlet 22 leads into the air and fuel passages of a carburetor (not shown) of the engine 14.

A second tubular handle 30 is disposed forwardly of, generally parallels and is supported from the handle 20 by means of suitable brackets 32. The upper end of the handle 30 includes a horizontal forwardly directed portion 34 having a second handgrip 36 mounted thereon and the forward end of the portion 34 is closed by means of a removable cap 38. The handle 30 defines a fuel tank and the lower end thereof is closed and the inlet end of a gasoline feed line 40 opens into the lower end of the handle 30, the outlet end of the gasoline feed line 40 opening into the fuel chamber of the carburetor (not shown) of the engine 14.

The engine 14 is of the manual start type and includes a pull cable 42 slidably received through an outer housing 44 extending upwardly along the handle 12 and 30 and having its upper end supported from a bracket 46 anchored relative to the handles 12 and 30. The upper end of the cable 42 has a pull handle 48 mounted thereon whereby the engine 14 may be started from the upper ends of the handles 12 and 30.

A guard plate 50 is secured beneath the horizontally forwardly directed lower end portion 52 of the handle 12 and includes a rearwardly and outwardly flared as well as downwardly curved rear portion 54. The guard plate 50, handle and engine 14 may all be considered parts of a support from which the shaft 16 of the engine 14 is rotatably journalled.

With attention now invited more specifically to FIGS. 2, 3, 4 and 5 of the drawings it may be seen that the shaft 16 includes a tapered lower end portion 56 having a blind threaded bore 58 formed therein. The lower end portion 56 is snugly seated in the tapering inner end portion 60 of an upwardly opening counterbore 62 formed in the upper end of an upstanding sleeve 64. The sleeve 64 has an axial bore 66 formed therethrough and the lower end of the bore 66 includes first and second counterbores 68 and 70, the counterbore 68 being smooth and terminating inwardly at the lower end of the bore 66 and the counterbore 70 being slightly larger in diameter than the counterbore 68 and threaded. The sleeve 64 is secured on the shaft 16 by means of a bolt 72 having its head seated in the counterbore 68 and its threaded shank portion passed through the bore 66 and threaded in the blind bore 58. The upper end of the sleeve 64 includes a diametrically enlarged terminal end 74.

The sleeve 64 has a pair of opposite side longitudinally extending flats 76 formed thereon and a hub sleeve 78 is mounted on the sleeve 64 and keyed thereto for rotation therewith by means of the flats 76. The hub sleeve 78 includes a diametrically opposite radially outwardly projecting pins 80 and the lower end of the hub sleeve 78 is diametrically reduced as at 82 and defines a downwardly opening circumferential seat 84 in which to seatingly receive the upper end of a compression spring 86. In addition, a lower terminal end of the hub sleeve 78 includes a downwardly opening counterbore 88 defining a downwardly facing circumferential rib 90 on the lower end of the hub sleeve 78 for a purpose to be hereinafter more fully set forth.

The upper end of the hub sleeve 78 has a thrust washer defining annulus 92 recessed therein and the diametrically enlarged upper terminal end 74 of the sleeve 64 overlies and abuts the inner periphery of the thrust washer defining annulus 92.

A horizontally disposed storage spool 94 including upper and lower flanges 96 and 98 is mounted on the hub sleeve 78 for rotation relative thereto and the upper flange 96 includes an inner peripheral portion 100 which seats against an upwardly facing annular shoulder 102 defined adjacent the upper end of the hub sleeve 78. Additionally, the lower flange 98 includes an inner peripheral portion 104 which snugly receives the lower end of the hub sleeve 78 therethrough and against which the lower end of the compression spring 86 bears.

A housing referred to in general by the reference numeral 106 is provided and includes a cylindrical wall portion 108 disposed in upstanding position and closed at its lower end means of a lower end wall 110 having a central opening 112 formed therethrough. The housing opens upwardly and has a sleeve 114 secured in the opening 12 and keyed to the lower end portion of the sleeve 64 which is also provided with diametrically opposite flats 116 corresponding to the flats 76. The upwardly opening housing 106 snugly but rotatably receives the spool 94 therein and the cylindrical wall portion 108 of the housing 106 includes a pair of diametrically opposite radial openings 118 formed therethrough in which metal grommets 120 are secured. Two lengths of plastic monofilament 122 have one end of each wound on the spool 94 between the flanges 96 and 98 and anchored relative to the spool 94 as at 124. The free ends of the filaments 122 extend tangentially away from the hub 126 of the spool 94 and pass outwardly through the grommets 120 and include free end portions 128.

The spool 94 is formed of upper and lower halves which are assembled and welded together in any convenient manner. The inner surface of the hub 126 of the spool 94 includes a circumferentially extending inwardly opening groove 130 (see FIG. 7) and the lower half 132 of the spool 94 includes circumferentially spaced ribs 134 which project upwardly into the lower half of the groove 130 while the upper half 136 of the spool 94 includes ribs 138 which project downwardly into the upper half of the groove 130. The ribs 134 and 138 are spaced circumferentially centrally between adjacent ribs 138 and 134, respectively, whereby the groove 130 is transformed into a serpentine passage. The outer ends of the pins 80 are received in the serpentine passage and the compression spring 86 normally biases the hub sleeve 78 upwardly along the sleeve 64 to the uppermost position thereof illustrated in FIG. 3 with the thrust washer defining annulus 92 abutted against the underside of the diametrically enlarged upper terminal end 74 of the sleeve 64 and the outer ends of the pins 80 received in the corresponding upper portions of the groove 130 between adjacent ribs 138.

A retaining cup referred to in general by the reference numeral 140 (see FIG. 3) is provided with a central threaded attaching stud 142 and the cup 140 is secured to the underside of the housing 106 by means of the threaded stud 142 being threadedly engaged in the threaded counterbore 70, a compression spring 144 being disposed about the threaded stud 142 and between the lower end of the sleeve 64 and the opposing upwardly facing central inner surfaces of the cup or cap 140.

The outer periphery of the lower end wall 110 is relieved as at 146 to minimize the area of contact 148 of the lower end wall 110 of the housing 106 with the underside of the lower flange 98 of the spool 94 and the central area of the lower end wall 110 is further relieved as at 150 to receive the rib 90 therein when the hub sleeve 78 is urged downwardly against the biasing action of the compression spring 86.

A mounting block 152 is secured to the underside of the shield or plate 50 by means of attaching fasteners 154 and a bifurcated actuating lever 156 is pivotally supported from the mounting block 152 as at 158 and has its furcations 160 disposed immediately above the thrust washer defining annulus 92 outwardly of the diametrically enlarged upper terminal end 74 of the sleeve 64. The free end of the lever 156 has one end of a Bowden cable assembly generally referred to by the reference numeral 162 anchored relative thereto and the other end of the Bowden cable assembly 162 is anchored to a control lever 164 pivotally supported from the upper end portion 18 of the handle 12 as at 166.

It is to be noted that upon an upward pull on the lever 164 the Bowden cable assembly 162 will exert an upward pull on the associated end of the lever 156 so as to swing the furcations 160 of the lever 156 downwardly into contact with the thrust washer defining annulus 92 of the hub sleeve 78. This of course will cause the hub sleeve 78 to be shifted downwardly relative to the sleeve 64 against the biasing action of the compression spring 68 and the pins to shift from the upper half of the groove 130 to the lower half of the groove 130.

With attention now invited more specifically to FIG. 6 of the drawings, it may be seen that the outer portions of the grommets 120 are bevelled as at 168 so as to define spaced first and second inner and outer corner bearing surfaces or edges 170 and 172 in the outer end of each grommet 120, the grommets 120 being substantially cylindrical in cross sectional shape.

In operation, the cutter 10 is used to cut vegetation 176 in the manner illustrated in FIG. 1 of the drawings during operation of the engine 14 to spin the spool 94 and housing 106 at high speeds. The outer end portions 128 of the filaments 122 cut with a flail action on the vegetation 176 during rapid spinning of the spool 94 and housing 106.

Figure 7:
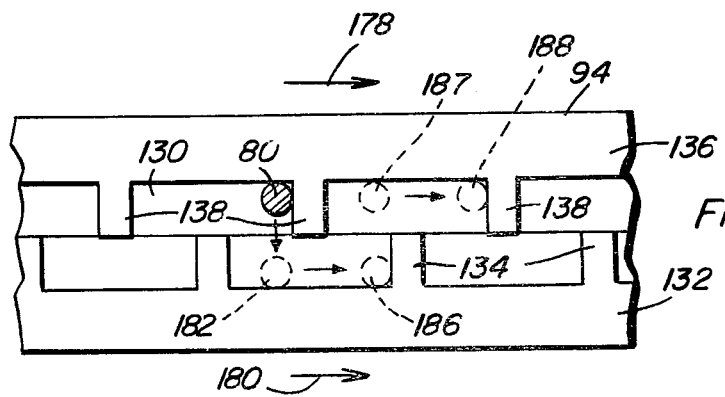
FIG. 7 is a fragmentary schematic view illustrating the manner in which increment feeding of the filament from the spool is accomplished.

As indicated in FIG. 7 of the drawings the pins 80 move in the direction of the arrows 178 and thus bear against diametrically opposite ribs 138 of the upper half 136 of the spool 94 and cause the latter to move in the direction of the arrow 180. However, when the lever 164 is actuated, the lever 156 forces the hub spool 78 downwardly so as to shift the pins 80 from the solid line position thereof illustrated in FIG. 7 to the phantom line position 182 of FIG. 7 in the lower half of the groove 130. Then, because of the windage drag and centrifugal force acting on the outer end portions 128 of the filaments 122 and the air drag on the upwardly projecting radial vanes 184 carried by the upper flange 96 of the spool 94, the spool 94 lags in rotation relative to the housing in order that the pins 80 may assume the positions thereof illustrated in phantom lines as at 186 in FIG. 7 to thereby extend a first increment of monofilament 122 from the spool 94 through the grommet 120. Thereafter, when the lever 164 is released, the hub sleeve 78 shifts back up to the position thereof illustrated in FIG. 3 under the biasing action of spring 86 so as to raise the pins 80 to the phantom line positions 187 in the upper half of the groove 130 and air drag and centrifugal force acting on the filament end portions 128 and the vanes 184 causes the spool 94 to further lag in rotation whereby the pins 80 assume the phantom line positions 188 in FIG. 7 to extend or feed further segments of filaments 122 from the spool 94. Thus, upward swinging of the lever 164 causes a first increment of each filament 122 to be fed or extended from the spool 94 through the corresponding grommet 120 and release of the lever 164 causes a second increment of each filament 122 to be extended or fed from the spool 94 through the corresponding grommet 120. The increment feeding of filaments 122 from the spool 94 may of course be carried out during operation of the cutter 10. Further, the successive angle edges 170 and 172 cause localized loading of the filaments 122 and thus those points of contact of the filaments 122 with the grommets 120 are weakened. However, upon initial operation of the cutter 10 successive segments of filament are fed from the spool 94 by actuation of the lever 164 and the extended end portions 128 of the filaments 122 disposed outwardly of the grommets 120 thereby include longitudinally spaced areas thereof which are weakened. Inasmuch as the outermost weakened areas travel at higher peripheral speeds, they impact the vegetation 176 with greater force and are more rapidly further weakened. This results in breakage of the filaments 122 most likely occuring at the outermost weakened areas thereof.

Thus, the incidence of breakage of the filaments 122 adjacent or inwardly of the grommets 120 is substantially reduced and continuous operation of the cutter 10 may be carried out. Should the filaments 122 exit from the housing 106 along a large radius curvilinear bearing surface as has been practiced heretofore, sufficient localized loading of the filaments at the bearing surfaces to support controlled breakage of the filaments outwardly of the point they exit from the housing 106 does not occur. Rather, breakage of the filaments 122 may occur inwardly of the housing 106 at the points of constrainment of the filaments on the spool. When such breakage occurs the free ends of the filaments 122 will attain positions inwardly of the grommets 120 thereby rendering the feed mechanism of the filaments 122 inoperative and necessitating that operation of the cutter 110 be terminated so that the cup 140 and housing 106 may be removed in order to thread the free end portions of the filaments 122 outwardly through the grommet 120.

In addition to providing localized loading on the filaments 122 as the latter are fed through the grommets 120, the angle edges 170 and 172 tend to absorb the tension forces on the filaments 122 due to centrifugal forces acting upon the free ends 128 thereof and to thereby prevent such tension forces from being transmitted inwardly of the housing 106 and excessive abrasion of the outer convolutions of the filaments 122 with adjacent convolutions thereof and subsequent breakage of the filaments 122 within the housing 106.

It is important that the openings through the cylindrical wall portion 108 of the housing 106 through which the filaments 122 extend be substantially circular in cross sectional shape as accomplished by the grommets 120. In this manner, inasmuch as the free ends 128 of the filaments 122 can vibrate considerably in vertical directions, excessive loading of the filaments 122 at the outer ends of the grommets 120 does not occur and breakage of the filaments 122 at their exit points from the grommets 120 is maintained at a minimum. Further, localized loading of the filaments 122 at the outer end of the grommets 120 may be effected by a single angular edge at either 170 or 172. However, in some instances it has been found to be beneficial to provide a pair of successive angular edges as at 170 and 172.

Figure 4:
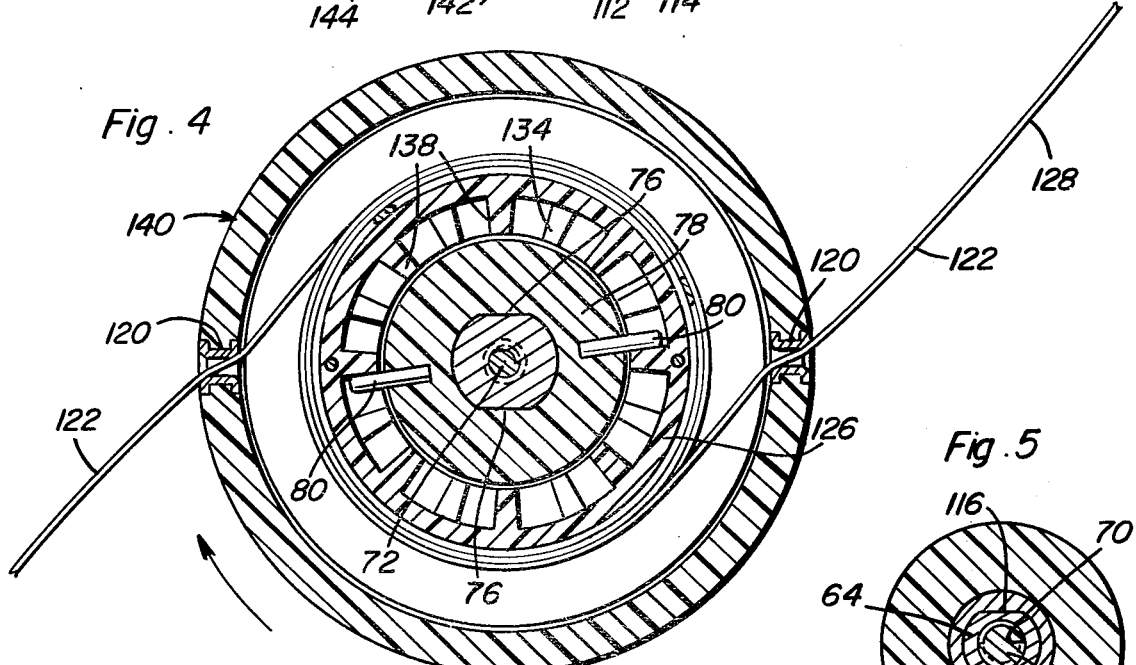
FIG. 4 is a horizontal sectional view taken substantially upon the plane indicated by the section line 4—4 of FIG. 3.
Figure 5:
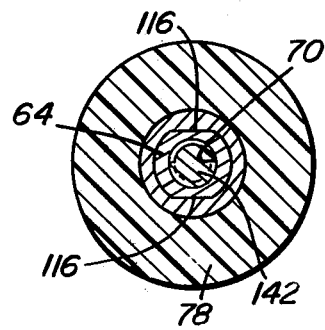
FIG. 5 is a horizontal sectional view taken substantially upon the plane indicated by the section line 5—5 of FIG. 3.

It will also be noted from FIG. 4 of the drawings that each filament 122 is deflected in opposite directions by its passage through the grommet 120. Although this successive opposite deflection of the monofilament 122 is not necessary, it does reduce excess tension forces acting upon the monofilament 122 inwardly of the grommet 120 and thereby greatly reduces abrasion of the outer convolution of the monofilament 122 within the housing 106 against adjacent convolutions of the monofilament 122.

Those surfaces of the ribs 134 and 138 which face in the direction opposite to the directions 178 and 180 may be inclined toward the center of the groove 130 either in the direction of the arrows 178 and 180 or opposite to the direction of the arrows 178 and 180, depending upon the strength of the spring 86 and the expected wind drag forces tending to retard rotation of the spool 94 relative to the hub sleeve 78.

The filaments may be of metallic materials, non-metallic materials or composite materials and only one filament need be used to perform a cutting operation. Further, the specific configuration of the bearing surface or surfaces is determined by the material of which the filaments are constructed, the expected rotational speed of the housing, and the inertia generated by the extended ends of the filaments at that speed. However, the configuration of the bearing surfaces is such to attain the aforementioned controlled breakage of the filaments adjacent their outer free ends rather than adjacent or inwardly of the bearing surfaces therefor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for cutting vegetation and the like comprising a support, a rotary member journalled from said support for rotation at high speed in a cutting plane, having storage means and including a support portion defining a peripherally located bearing surface, at least one elongated flexible flail member having storage and free end portions, said storage end portion being supported from said storage means for feeding of said free end portion therefrom, said free end portion extending outwardly from the axis of rotation of said rotary member and being trained across said bearing surface, means for driving said rotary member in one direction of rotation, said bearing surface facing generally in said direction of rotation of said rotary member, said storage means including spool means upon which said storage end portion is wound, said spool means being supported from said rotary member for rotation relative thereto, said spool means being disposed substantially concentric with the axis rotation of said rotary member and rotatable relative to said support portion, a drive member mounted on said rotary member for rotation therewith and axially shiftable thereon for movement between first and second positions, said drive member and spool including coacting portions engageable with each other to drive said spool, in said one direction, with said drive member when said drive member is in said first position and operative to allow first and second predetermined angular rotation, only, of said spool in the opposite direction relative to said rotary member as a result of shifting of said drive member from said first position to said second position and then back to said first position from said second position.

2. The combination of claim 1 wherein said spool means includes means defining an inwardly opening annular groove extending about said spool means concentric with said axis, said spool means including means defining abutments in axially opposite ends of said groove spaced alternately thereabout, said drive member including a portion disposed radially inwardly of said groove and having an abutment engageable member supported therefrom selectively shiftable into opposite ends of said groove for alternately abutting said abutments upon shifting of said drive member between said first and second positions.

3. A head rotatable in a cutting plane, a spool supported from said head for rotation relative thereto, an elongated flail member including base and free end portions and having its base end portion wound on said spool, said head including bearing surface means spaced outwardly of the axis of rotation of said head and facing, generally, in the direction of rotation of said head, said free end portion extending across said bearing surface and extending outwardly therefrom away from said axis, control means supported from said head and shiftable axially of the axis of rotation of said head between first and second positions, said control means and spool including coacting means operative to prevent rotation of said spool relative to said head in a first direction to unwind said base end portion from said spool when said control means is in said first position, operative to allow initial predetermined angular displacement, only, of said spool in said first direction in response to shifting of said control from said first position to said second position and subsequent predetermined angular displacement, only, of said spool in said first direction in response to shifting of said control means from said second position back to said first position.

* * * * *